Figure 1:
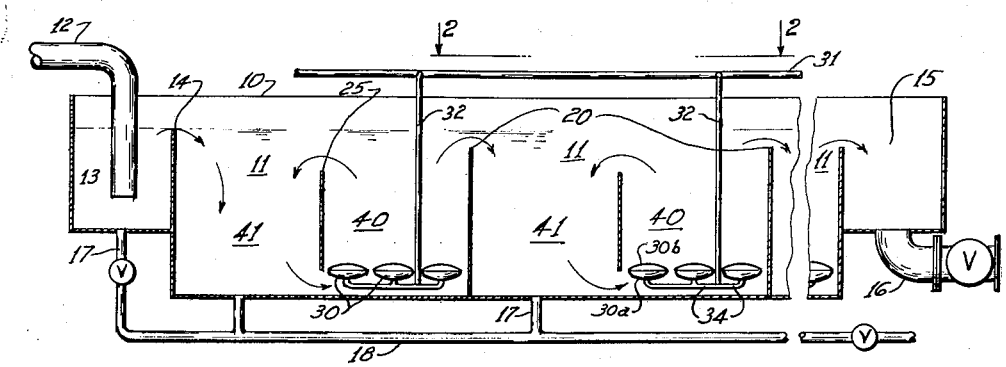

Sept. 20, 1955　　　　R. B. BANKS　　　　2,718,275

DEGASIFYING APPARATUS AND METHOD

Filed April 27, 1953

INVENTOR.

BY

United States Patent Office 2,718,275
Patented Sept. 20, 1955

2,718,275
DEGASIFYING APPARATUS AND METHOD

Robert B. Banks, Tucson, Ariz., assignor to Infilco Incorporated, Tucson, Ariz., a corporation of Delaware Application April 27, 1953, Serial No. 351,363

11 Claims. (Cl. 183—2.5)

This invention relates to an apparatus and method for degasifying liquids.

It is an object of this invention to provide an improved apparatus for efficient degasification by means of aeration.

Another object of this invention is to provide a method of, and an apparatus for, removing gases, such as carbon dioxide, hydrogen sulfide, and the like, from liquids by subjecting the liquids to stepwise recirculating degasification.

Another object is to provide an apparatus of this general type with efficient air utilization.

Another object is to provide an apparatus of this general type which can be readily adapted to the treatment of liquids with widely varying gas concentrations and to any degree of degasification required.

Other objects will become apparent from the detailed description and the claims which follow.

The removal of carbon dioxide, hydrogen sulfide, and other gases from liquids has heretofore been effected ordinarily in so-called forced draft aerators. Such aerators comprise a baffled tower of considerable height through which air is blown either countercurrently, or parallel, or cross flow, to the liquid to be treated. The hydraulic head loss through an aerator of this type is quite high. It is, therefore, a specific object of the invention to provide an apparatus for degasifying liquid which operates without substantial head loss.

The contact time in a forced draft aerator is only a few minutes. Direct oxidation due to aeration, which is desirable, for example, in treating liquids containing hydrogen sulfide, is not readily obtainable in such a short period of contact. It is, therefore, an object of this invention to provide a degasifying apparatus wherein the contact time between the liquid and the air used in degasification is sufficiently long for direct oxidation.

I suggest to degasify liquids by aeration in a relatively shallow open tank in a plurality of consecutive cells and to recirculate the liquid within each cell, whereby the contact time is increased and the scrubbing gas is thoroughly mixed with the liquid to be degasified. The cells are separated from one another by suitable partition means which permit forward flow through the series of cells, such as a partition extending from the bottom of the cell to an elevation below the normal liquid level therein and providing a submerged overflow, or a partition of the "round the end" type extending for the full height of the tank but stopping short of its side walls on alternate sides in successive cells. In each cell a partial partition or baffle of the over-under type is mounted at right angles to the flow through the cell.

The tank may take various forms, such as round, square or elongated, and the cells can be arranged in different ways, such as radially or annularly in a round tank, peripherally in a square tank, and sequentially along the tank length in an elongated tank, the important thing being that the apparatus provides a generally forward path from cell to cell involving practically no loss of head and affording stepwise degasification with prolonged contact time due to recirculation within each cell or step.

Figure 2:
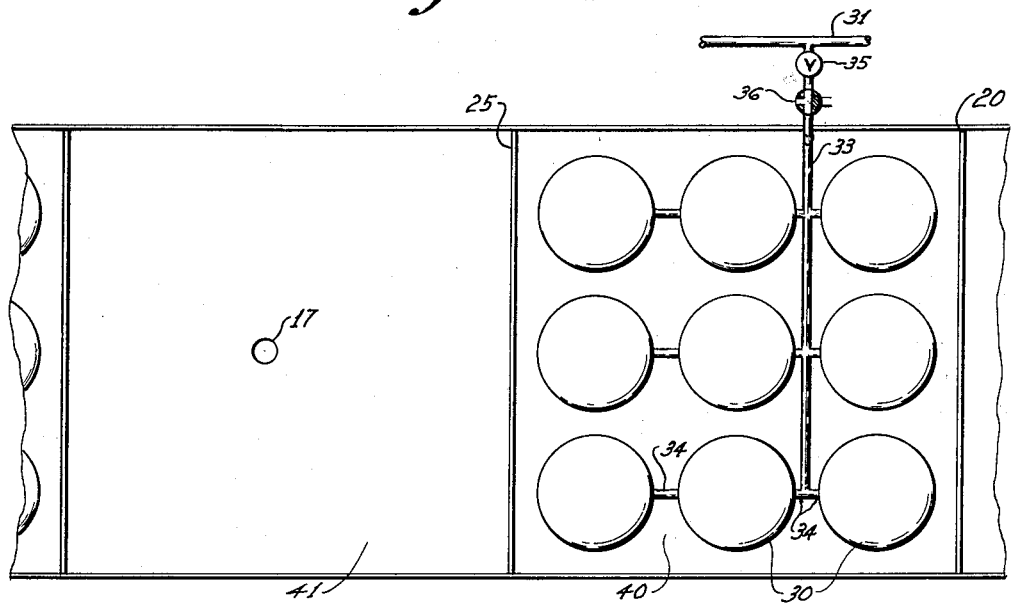
Figure 3:
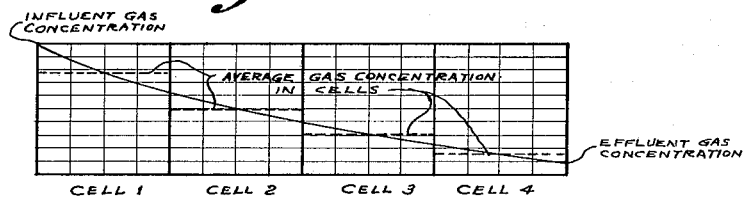

The invention will be more readily understood by reference to the drawing wherein Figure 1 is a vertical cross-sectional view of a degasifying apparatus according to the invention;

Figure 2 is an enlarged plan view of the portion of the apparatus of Figure 1 indicated by line 2—2 of Figure 1; and Figure 3 is a graphic illustration of the stepwise degasification obtained in the apparatus.

The tank 10 shown in the figures may have any desired length and may include any suitable number of treating cells 11, depending on the concentration of the gas to be removed, the ratio of air supplied for the treatment to the flow of liquid to be treated, and the degree of degasification required. The cells 11 are arranged in series. The liquid to be treated arrives through an inlet pipe 12 which discharges to an inlet chamber 13 and overflows therefrom over a partition 14 into the first cell 11. Treated liquid overflows from the last cell of the series into an outlet chamber 15 and is withdrawn therefrom through a valved outlet pipe 16. The cells 11 and the inlet chamber 13 are provided with suitable drains 17, which may all discharge to a common drain header 18.

The cells 11 are separated from one another by partial partitions 20, which can be of the "round the end" type, but are shown for purposes of illustration as extending upwardly from the tank bottom across the entire width of the tank 10. In each cell 11 a second partial partition or baffle 25 is provided which extends across the width of the cell at right angles to the direction of flow through the cell, and upwardly from an elevation spaced above the tank bottom to an elevation below the upper end of the partitions 20.

Each cell 11 is provided with air diffusion means downstream of its baffle 25 and upstream of the partition 20 which separates it from the next following cell of the series. Any suitable diffusion means may be used, such as porous plates or tubes, or the collapsible diffusers 30 shown in the figures for purposes of illustration and exemplification. Such collapsible diffusers comprise a lower impervious rigid cup 30a, and affixed thereto an upper diffusion element 30b of porous flexible material, which is distended by air under pressure entering the diffuser through an inlet in the cup. Air under pressure from any suitable source, not shown, arrives through an air header 31, from which a connection 32 extends into each cell. This pipe 32 connects to a horizontal pipe 33 at the bottom of the cell 11. Each diffuser 30 is connected to the pipe 33 of its cell by branch pipes 34, as shown. Each pipe 32 is provided with a valve 35, so that the air can be shut off from the diffusers of individual cells, while the diffusers of other cells are operating. The three-way valve 36, also shown on line 32, is used only when the diffusers are of the collapsible type shown in the figures, and serves to connect the diffusers to atmospheric pressure to cause their collapsing when it is desired to clean the porous fabric from deposits. While nine diffusers, arranged in three groups of three each, are shown in one cell in Figure 2, the actual number of diffusers used will be determined for each installation in accordance with the quantity of air needed for the treatment.

The baffles 25 provide in each cell 11 an upflow section 40 above the diffusers 30 and a return flow section 41 upstream of the baffle 25. Due to the lifting action of the gas discharged into the upflow section 40 of each cell, a liquid circulation is set up within the cells upwardly in the upflow section 40, over the top of the baffle 25, downwardly in the return flow section 41 and back to the upflow section 40 under the baffle 25. An output portion of liquid is displaced from each cell 11 of the series by newly entering liquid and overflows the respective partition 20 to the return flow section 41 of the next following cell 11, or in the case of the last cell 11 to the outlet chamber 15.

Newly entering liquid overflowing the partition 14 to the return flow section of the first cell 11 encounters, and is mixed with, a stream of recirculating liquid which has been partially degasified in the upflow section of that cell, and the mixture is further degasified as it passes into and through the upflow section of the cell. As the liquid passes through the apparatus, it is mixed and diluted in the return flow section of each successive cell with recirculating liquid which has a lower gas concentration than the entering liquid, and the mixture is further degasified by aeration as it flows over the diffusers and rises in the upflow section. Thus, as shown in Figure 3 for a four cell installation in each of the cells, numbered 1 to 4, the average gas concentration is somewhat lower than the concentration in the entering liquid and is somewhat higher than the concentration in the effluent of the cell. The gas concentration of the liquid under treatment is reduced in distinct steps as it passes through successive cells until the desired degree of degasification is reached.

The apparatus has been tested under the following conditions: (a) equal air rate to all cells, (b) air rate per cell decreasing from the first to the last cell, and (c) air rate per cell increasing from the first to the last cell. It has been found that with all other conditions constant, the total quantity of air needed to obtain the same degree of degasification was the same in all three methods of introduction of air. Since the introduction of air at equal rates to all cells permits standardizing the cell design and using identical diffusion apparatus in all cells, uniform application of air appears to be the most economical manner of operation.

Table I below exemplifies results obtained in the removal of carbon dioxide with varying quantities of air used per gallon of liquid to be treated, varying detention times, and varying influent gas concentrations.

TABLE I

| Test | Liquid, G. P. M.[1] | Air, C. F. M.[2] | Air-Liquid Ratio, C. F./gal.[3] | Time, min.[4] | Carbon Dioxide, Concentration, p. p. m.[5] | |
|---|---|---|---|---|---|---|
| | | | | | Influent | Effluent |
| 1 | 6.35 | 5.21 | 0.821 | 6.97 | 65 | .5.5 |
| 2 | 6.35 | 3.67 | 0.580 | 6.97 | 64 | 8 |
| 3 | 6.35 | 2.25 | 0.355 | 6.97 | 66 | 14.5 |
| 4 | 6.35 | 0 | 0 | 6.97 | 63 | 57 |
| 5 | 3.34 | 5.19 | 1.55 | 13.2 | 61 | 4 |
| 6 | 3.34 | 3.85 | 1.15 | 13.2 | 58 | 5 |
| 7 | 3.34 | 2.02 | 0.61 | 13.2 | 60 | 8 |
| 8 | 1.07 | 5.19 | 4.85 | 41.3 | 61 | 3 |
| 9 | 3.90 | 5.22 | 1.34 | 11.3 | 57 | 4.5 |
| 10 | 3.90 | 2.50 | 0.64 | 11.3 | 57 | 6.5 |
| 11 | 3.90 | 5.22 | 1.34 | 11.3 | 25 | 2.5 |
| 12 | 3.90 | 2.50 | 0.64 | 11.3 | 25 | 4 |
| 13 | 3.90 | 5.22 | 1.34 | 11.3 | 16 | 2 |
| 14 | 3.90 | 2.50 | 0.64 | 11.3 | 16 | 3 |
| 15 | 5.53 | 5.13 | 0.93 | 8.0 | 80 | 7 |
| 16 | 3.47 | 3.16 | 0.91 | 12.75 | 86 | 7 |
| 17 | 2.54 | 2.33 | 0.92 | 17.4 | 77 | 7 |
| 18 | 1.07 | 0.97 | 0.91 | 41.3 | 80 | 7 |
| 19 | 4.11 | 5.18 | 1.26 | 10.8 | 96 | 6 |
| 20 | 4.11 | 3.08 | 0.75 | 10.8 | 100 | 10 |

[1] Gallons per minute.
[2] Cubic feet per minute.
[3] Cubic feet per gallon.
[4] Minutes.
[5] Parts per million.

In tests 1 to 10 the influent concentration varied only slightly from a maximum of 65 p. p. m. to a minimum of 57 p. p. m. Results indicate that wth constant influent gas concentration and an apparatus of given capacity, the effluent concentration depends solely on the air-liquid rate ratio. Therefore, with a given apparatus and substantially constant influent gas concentration, when the rate of liquid flow increases or decreases, the rate of air addition must be increased or decreased accordingly to obtain the same effluent concentration. The increase or decrease of the detention time due to decrease or increase of the liquid flow rate does not affect the effluent concentration, provided the air-liquid rate ratio is maintained constant. This is also shown in tests 15 to 18, where the influent concentration and air-liquid rate ratio were substantially constant, but the liquid rate, and accordingly the detention time, were varied over a wide range, and the effluent concentration in the four tests was the same.

The results tabulated above were obtained in an eight cell apparatus. The decrease in carbon dioxide concentration was obtained in distinct steps through the individual cells, as shown in Table II, where the gas concentration in the effluent of consecutive cells is tabulated for five of the tests.

TABLE II

Carbon dioxide concentration p. p. m.

| Test | Influent | Effluent | | | | | | | |
|---|---|---|---|---|---|---|---|---|---|
| | | Cell 1 | Cell 2 | Cell 3 | Cell 4 | Cell 5 | Cell 6 | Cell 7 | Cell 8 (Final Effl.) |
| 1 | 65 | 31 | 19 | 14 | 10 | 9 | 7 | 6 | 5.5 |
| 2 | 64 | 37 | 24 | 18 | 15 | 12.5 | 10 | 9 | 8 |
| 7 | 60 | 32 | 22 | 18 | 14 | 11 | 10 | 9 | 8 |
| 10 | 57 | 27 | 18 | 14 | 10 | 9 | 8 | 7 | 6.5 |
| 19 | 96 | 38 | 24 | 17 | 12 | 9 | 8 | 7 | 6 |

While the degasifying results of the apparatus are relatively independent of variations in the detention time due to variations in liquid flow, as long as the proper air-liquid ratio is maintained, the actual contact time between air and liquid for a given flow and a given air-liquid ratio is important. The longer this contact time, the better the air utilization, and the more opportunity for direct oxidation. The stepwise aeration with recirculation of the liquid-gas mixture in each cell of the apparatus affords a relatively long contact time, and therefore high air utilization, and also makes direct oxidation possible where this is desirable.

It will be obvious that the apparatus can be readily adapted to widely varying conditions by temporarily cutting out aeration in one or more cells as the volume of flow, or the concentration of the gas to be removed, decreases. Similarly, if an expansion of an existing plant becomes necessary, new cells can be added without difficulty to provide the necessary capacity.

Many modifications of the apparatus could be made without departing from the scope and spirit of the invention. Thus, it will be obvious to those skilled in the art that partitions extending above the normal liquid level and provided with slots below the liquid level could be used instead of the partial partitions over which the liquid flows from cell to cell. Accordingly, the invention is not to be construed as limited to the exact structural details of the embodiment shown and described herein for purposes of illustration but not of limitation.

I claim:

1. An apparatus for degasifying liquids comprising a tank having inlet means for liquid to be degasified and outlet means for degasified liquid establishing a normal liquid level in said tank, said tank providing a path for a generally forward flow from said inlet means to said outlet means, a plurality of partitions extending from the bottom upwardly and dividing said tank into a plurality of adjacent cells in hydraulic communication with one another, a baffle in each cell extending at right angles to the direction of flow through the cell from an elevation spaced above the bottom to an elevation below said normal liquid level, and means in each cell downstream of its baffle for diffusing gas into liquid flowing through said cell.

2. An apparatus for degasifying liquids comprising an elongated tank having inlet means for liquid to be degasified and outlet means for degasified liquid functionally remote from said inlet means and establishing a normal liquid level in said tank, said tank providing a path for a generally forward flow from said inlet means to said outlet means, a plurality of spaced partial partitions extending from the tank bottom upwardly and forming in said tank a series of adjacent cells in hydraulic communication for forward flow through the series, a baffle in each cell at right angles to the flow through the cell and spaced below said normal liquid level and above the bottom of the cell, and means in each cell downstream of said baffle for diffusing gas into liquid flowing through said cell.

3. An apparatus for degasifying liquids comprising an elongated tank having inlet means for liquid to be degasified and outlet means for degasified liquid functionally remote from said inlet means, said tank providing a path for a generally forward flow from said inlet means to said outlet means, a plurality of spaced partitions extending across the width of said flow path from the tank bottom upwardly and forming in said tank a series of adjacent cells in hydraulic communication for forward flow through the series, gas diffusion means in each of said cells adjacent the partition separating it from the following cell in the direction of flow, and a baffle in each cell upstream of said gas diffusion means, said baffle extending across the width of said cell from an elevation spaced above the bottom to an elevation below the upper end of said partition.

4. An apparatus for degasifying liquids comprising a tank having inlet means for liquid to be degasified and outlet means for degasified liquid functionally remote from said inlet means and establishing a normal liquid level in said tank, said tank providing a path for a generally forward flow from said inlet means to said outlet means, a plurality of spaced partial partitions extending from the tank bottom upwardly and forming in said tank a plurality of adjacent cells in hydraulic communication for forward flow, a baffle in each cell, said baffle extending at right angles to the direction of flow through the cell from an elevation spaced above the bottom to an elevation below said normal liquid level, gas diffusion means in each of said cells downstream of said baffle, and means for selectively admitting air under pressure to the gas diffusion means of all cells and to cut off air from the gas diffusion means of some of said cells and admit air to the others.

5. An apparatus for degasifying liquids comprising a tank having inlet means for liquid to be degasified and outlet means for degasified liquid and providing a path for a generally forward flow from said inlet means to said outlet means, a plurality of partial partitions extending across said flow path from the bottom upwardly and dividing said tank into a plurality of adjacent cells in hydraulic communication with one another over said partitions, a baffle in each cell extending at right angles to the direction of flow through the cell from an elevation spaced above the bottom to an elevation below the upper end of said partition means, and gas diffusion means in the lower portion of each cell downstream of its baffle.

6. An apparatus for degasifying liquids comprising an elongated tank having inlet means at one end and outlet means at the opposite end, a plurality of spaced partial partitions extending across the width of said tank between said inlet means and said outlet means, alternating of said partitions extending upwardly from the bottom of said tank and forming in said tank a plurality of adjacent consecutive cells, and an overflow at the outlet end of each cell, the others of said partitions being spaced above said bottom and extending to an elevation below the upper end of said alternate partitions and forming in said cells an upflow section adjacent its outlet end and a return flow section adjacent its inlet end, and gas diffusing means in the lower portion of each of said upflow sections.

7. A method of degasifying a liquid comprising diffusing air under pressure into the liquid to be degasified in a series of successive zones arranged to provide a generally horizontal forward path, recirculating liquid within each zone from its outlet portion to its inlet portion, mixing liquid entering a degasifying zone with recirculating partially degasified liquid in the inlet portion of said zone, then subjecting the mixture to air diffusion in the outlet portion of said zone, withdrawing an output portion of partially degasified liquid from said outlet portion to the inlet portion of the next following zone and there mixing it with further degasified liquid from the outlet portion of said next following zone having a lower gas concentration than said output portion, then subjecting the mixture to air diffusion in the outlet portion of said next following zone, repeating this treatment in each following zone of the series, whereby the gas concentration of said liquid is stepwise reduced, and withdrawing liquid with a predetermined gas concentration from the last zone of the series.

8. A method of degasifying a liquid comprising flowing the liquid in a generally horizontal path through a series of degasifying zones, diffusing scrubbing gas into the liquid in a portion only of each of said zones, establishing in each of said zones a gas lift supported circulation having an upflow component in said portion of the zone and a downflow component in another portion of said zone, introducing liquid entering a zone for treatment into the downflow component of said circulation, whereby newly entering liquid is mixed with liquid having a lower gas concentration before it is subjected to diffusion of scrubbing gas in said zone, withdrawing an output portion of partially degasified liquid from said zone into the following zone, repeating the treatment in each zone of the series, and withdrawing degasified liquid from the last zone of the series.

9. An apparatus for degasifying liquids comprising a tank having inlet means for liquid to be degasified and outlet means for degasified liquid establishing a normal liquid level in said tank, said tank providing a path for a generally forward flow from said inlet means to said outlet means, a plurality of partitions dividing said tank into a plurality of adjacent cells in hydraulic communication with one another, a baffle in each cell extending across the flow through the cell from an elevation spaced above the bottom of said tank to an elevation below said normal liquid level, and means in each cell downstream of its baffle for diffusing gas into liquid flowing through said cell.

10. An apparatus for degasifying liquids comprising an elongated tank having inlet means for liquid to be degasified and outlet means for degasified liquid functionally remote from said inlet means and establishing a normal liquid level in said tank, said tank providing a path for a generally forward flow from said inlet means to said outlet means, a plurality of spaced partial partitions forming in said tank a series of adjacent cells in hydraulic communication for forward flow through the series, a baffle in each cell across the flow through the cell and spaced below said normal liquid level and above the bottom of the cell, and means in each cell downstream of said baffle for diffusing gas into liquid flowing through said cell.

11. An apparatus for degasifying liquids comprising a tank having inlet means for liquid to be degasified and outlet means for degasified liquid functionally remote from said inlet means and establishing a normal liquid level in said tank, said tank providing a path for a generally forward flow from said inlet means to said outlet means, a plurality of spaced partial partitions forming in said tank a plurality of adjacent cells in hydraulic communication for forward flow, a baffle in each cell, said baffle extending across the direction of flow through the cell from an elevation spaced above the cell bottom to an elevation below said normal liquid level, gas diffusion means in each of said cells downstream of said baffle, and means for selectively admitting gas under pressure to the gas diffusion means of all cells and to cut off gas from the gas diffusion means of some of said cells and admit gas to the others.

References Cited in the file of this patent

UNITED STATES PATENTS

| | | |
|---|---|---|
| 699,294 | Dolphin | May 6, 1902 |
| 1,455,927 | Morison | May 22, 1923 |
| 1,960,982 | Stover | May 29, 1934 |

FOREIGN PATENTS

| | | |
|---|---|---|
| 199,748 | Great Britain | June 25, 1933 |
| 264,079 | Great Britain | Jan. 13, 1927 |
| 286,622 | Great Britain | June 5, 1929 |
| 505,351 | Belgium | Feb. 20, 1952 |
| 621,856 | France | May 19, 1927 |
| 638,198 | Great Britain | May 31, 1950 |